Patented Oct. 4, 1932

1,881,317

UNITED STATES PATENT OFFICE

BAPTIST REUTER AND MATHILDE REUTER, OF KRAILLING-PLANEGG, GERMANY

PROCESS OF COMBINING 4-DIMETHYLAMINO-1-PHENYL-2.3-DIMETHYL-5-PYRAZOLONE WITH ONE OF THE ESTERS OF P. AMINOBENZOICACID AND THE PRODUCTS

No Drawing. Application filed April 12, 1930, Serial No. 443,910, and in Germany July 30, 1928.

Our invention is directed to new chemical products of very good therapeutical effect and to the process of manufacturing them, while combining 4-dimethylamino-1-phenyl-2.3-dimethyl-5-pyrazolone with esters of the p. aminobenzoicacid, for example the ethylester and the isobutylester of said acid.

The new compounds are obtained by melting together 1 molecule 4-dimethylamino-1-phenyl-2.3-dimethyl-5-pyrazolone with 1 molecule of one of the esters of the aminobenzoicacid on the steambath. They may be ground after refrigeration or recrystallized from indifferent solvents.

We obtain the same compounds, while boiling a solution of 1 molecule 4-dimethylamino-1-phenyl-2.3-dimethyl-5-pyrazolone with 1 molecule of one of the said esters in alcohol, ether, benzol and other indifferent organic liquids and cooling down after effected solution. The new products are obtained in white crystals and show sharp melting points.

Instead of crystallizing the solution it is also possible to evaporate in vacuo to dryness.

The new products are different from a mechanical mixture of both components. A mechanical mixture of the single components shows an unsharp melting point as described in the following examples.

(1) Product of 4-dimethylamino-1-phenyl-2.3-dimethyl-5-pyrazolone-p. aminobenzoicacidethylester. The new compound 4-dimethylamino-1-phenyl-2.3-dimethyl-5-pyrazolone and p. aminobenzoicacidethylester melts at 95-96 degrees C., while a mechanical mixture melts from 82 until 100 degrees C.

It is proved, that a new mechanical product is formed by the following statement: The new product can be crystallized from indifferent liquids such as alcohol, ether and so forth in different fractions and each fraction will show the unchanged melting point of 95-96 degrees C.

Tested by analysis those different fractions of crystallization show the same content of 14.1% N. corresponding to the formula 1 molecule 4-dimethylamino-1-phenyl-2.3-dimethyl-5-pyrazolone and 1 molecule p. aminobenzoicacidethylester expressed by the formula $C_{22}H_{28}O_3N_4$. Ether dissolves in 100 parts about 5 parts only of 4-dimethylamino-1-phenyl-2.3-dimethyl-5-pyrazolone, whereas it dissolves in 100 parts about 25 parts of p. aminobenzoicacidethylester. If there would not be formed a chemical compound the different crystallizations from ether would show different melting points and different analytical values.

(2) Product of 4-dimethylamino-1-phenyl-2.3-dimethyl-5-pyrazolone-p. aminobenzoicacidisobutylester. The new compound 4-dimethylamino-1-phenyl-2.3-dimethyl-5-pyrazolone-p. aminobenzoicacidisobutylester is melting at 72-73 degrees C., while a mechanical mixture of both components 1 molecule to 1 molecule melts from 53-90 degrees C.

It is proved, that a new chemical product is formed by the following statement: The new product can be crystallized from indifferent liquids such as alcohol, ether and so forth in different fractions and each fraction will show the unchanged melting point of 72-73 degrees C.

Tested by analysis those different fractions of crystallization show the same content of 13.2% N, corresponding to the formula 1 molecule 4-dimethylamino-1-phenyl-2.3-dimethyl-5-pyrazolone and 1 molecule p. aminobenzoicacidisobutylester expressed by the formula $C_{24}H_{32}O_3N_4$. Ether dissolves in 100 parts only 5 parts of 4-dimethylamino-1-phenyl-2.3-dimethyl-5-pyrazolone, whereas it dissolves in 100 parts about 66 parts p. aminobenzoicacidisobutylester. If a chemical compound were not formed the different crystallizations from ether would show different melting points and different analytical values. The new products have compared with a mechanical mixture of both components certain advantages.

A mechanical mixture has the properties of the separate components. 4-dimethylamino-1-phenyl-2.3-dimethyl-5-pyrazolone tastes very bitter, p. aminobenzoicacidethyl and isobutylester are of strong anæsthetical effect, so that a mechanical mixture of one of the esters with 4-dimethylamino-1-phenyl-2.3-dimethyl-5-pyrazolone would be refused by many patients. Swallowing difficulties sometimes occur in the use of the mechanical mixtures. In the new products both properties, the bitter taste and strong anæsthetic effect, are reduced to a minimum so, that they can be taken very easy by even sensitive people. The new compounds show a new therapeutical effect are analgesics and are useful in cases of rheumatism, colds, gastralgia, headache trouble etc.

*Examples*

I. Preparation of the p. aminobenzoicacidethylester compound. $C_{22}H_{28}N_4O_3$.

(1) 33 grams of the p. aminobenzoicacidethylester, and 46.2 grams 4-dimethylamino-1-phenyl-2.3-dimethyl-5-pyrazolone are heated on the steam bath while stirring until all is liquid. This fusion is the new product and crystallizes in cooling down. The fusion may be used directly as it is after grinding. It is also possible to recrystallize the melting from indifferent organic liquids. The process may be illustrated by the following equation:

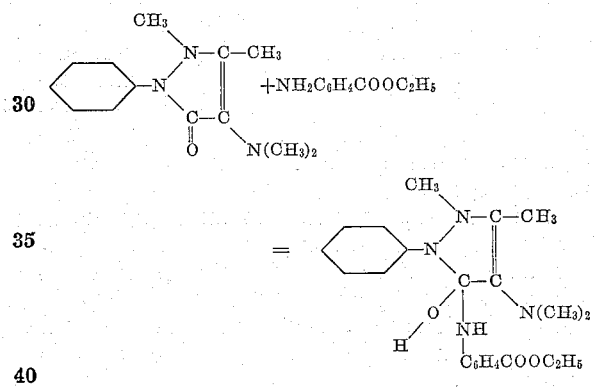

(2) 33 grams of p. aminobenzoicacidethylester and 46.2 grams 4-dimethylamino-1-phenyl-2.3-dimethyl-5-pyrazolone are heated on the steam bath with 40 grams of ethylalcohol for half an hour and cooled to about 15 degrees C. while stirring. One obtains white crystals, which are separated and dried in vacuo. From the evaporated mother liquor more crystals are received by evaporating.

(3) 33 grams of ethylester of the p. aminobenzoicacid and 46.2 grams of 4-dimethylamino-1-phenyl-2.3-dimethyl-5-pyrazolone are dissolved in alcohol and after boiling for ½ hour the solution is evaporated in vacuo to dryness.

The new compound is soluble in alcohol, benzol, ether and shows the melting point 95–96 degrees C.

II. Preparation of the p. aminobenzoicacidisobutylester compound. $C_{24}H_{32}O_3N_4$.

(1) 19.3 grams of p. aminobenzoicacidisobutylester and 23.1 grams 4-dimethylamino-1-phenyl-2.3-dimethyl-5-pyrazolone are heated on the steam bath while stirring until all is liquid. This new fusion is the new product and cyrstallizes in cooling down.

This fusion may be used directly as it is after grinding.

It is also possible, to recrystallize the melting from indifferent organic liquids.

The process may be illustrated by the following equation:

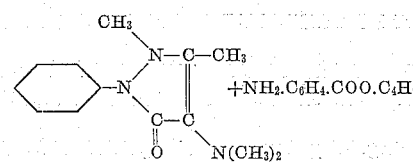

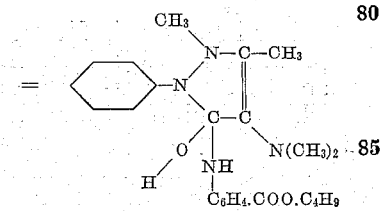

(2) 10.3 grams of p. aminobenzoicacidisobutylester and 23.1 grams 4-dimethylamino-1-phenyl-2.3-dimethyl-5-pyrazolone are heated on the steam bath with 20 grams of ethylalcohol for half an hour and cooled to about 15 degrees C. while stirring. One obtains white crystals which are separated and dried in vacuo. From the evaporated mother liquor more crystals are received by evaporating.

(3) 19.3 grams of isobutylester of the p. aminobenzoicacid and 23.1 grams of 4-dimethylamino-1-phenyl - 2.3-dimethyl - 5 - pyrazolone are dissolved in alcohol and after boiling for ½ hour the solution is evaporated in vacuo to dryness.

The new compound is soluble in alcohol, benzol, ether and shows the melting point 72–73 degrees C.

Claims:

1. The process of making new compounds, of 4-dimethylamino-1-phenyl-2.3-dimethyl-5-pyrazolone with p. aminobenzoic acid esters of the general formula:

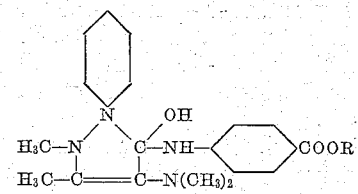

wherein R stands for an alkyl radical, which process comprises condensing one molecule of 4-dimenthyl-amino-1-phenyl-2.3-dimethyl-5-pyrazolone with one molecule of a p. aminobenzoic acid ester, mixing the said two compounds finest in any way preferably in portion of one molecule to one molecule and heating up the mixture until the reaction is ended.

2. The process of making new compounds of 4-dimethylamino-1-phenyl-2.3-dimethyl- 5-pyrazolone with p. aminobenzoic acid esters of the general formula:

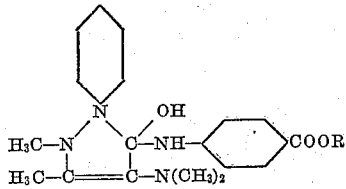

wherein R stands for an alkyl radical, which process comprises condensing one molecule of 4 - dimethylamino-1-phenyl-2.3-dimethyl - 5 - pyrazolone with one molecule of a p. aminobenzoic acid ester, mixing finest preferably in proportions of one molecule to one molecule of the said two compounds by dissolving them in indifferent dissolving liquids and heating up to boiling for a while.

3. As new products the compounds of the following formula:

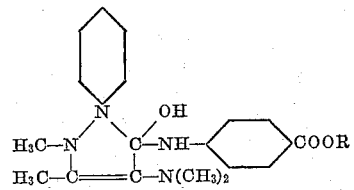

wherein R stands for an alkyl radical, forming white crystals which are readily soluble in alcohol, ether, benzol, toluol and other indifferent liquids of the same kind, hardly soluble in water.

4. As a new product, the compound of the following formula:

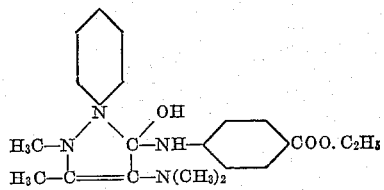

melting from 95–96 degrees Celsius and forming white crystals which are readily soluble in alcohol, ether, benzol, toluol and other indifferent liquids of the same kind, hardly soluble in water.

In testimony whereof we affix our signatures.

BAPTIST REUTER.
MATHILDE REUTER.